No. 783,796. PATENTED FEB. 28, 1905.
W. NEWBY.
CULTIVATOR.
APPLICATION FILED JULY 20, 1904.
2 SHEETS—SHEET 1.
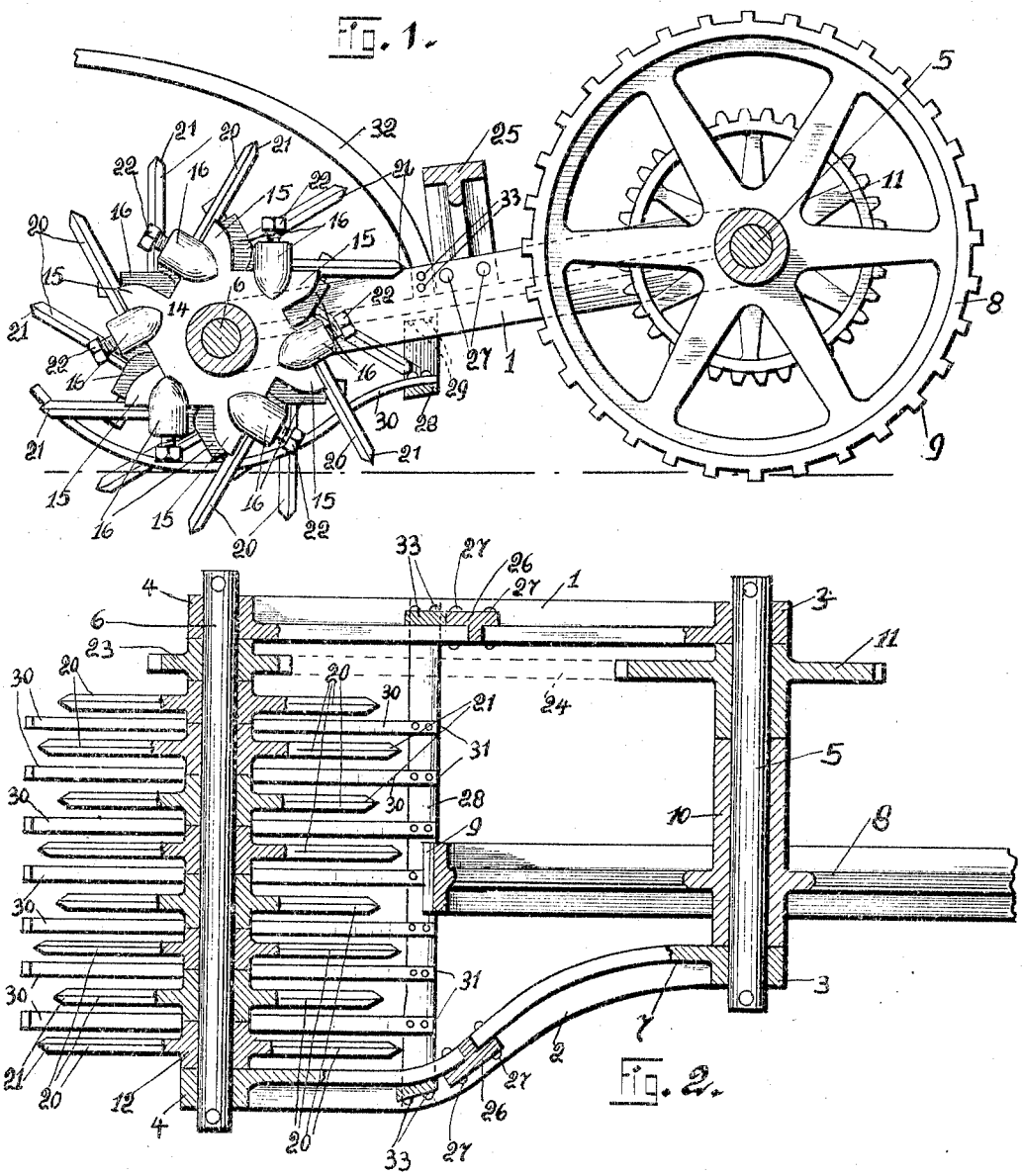

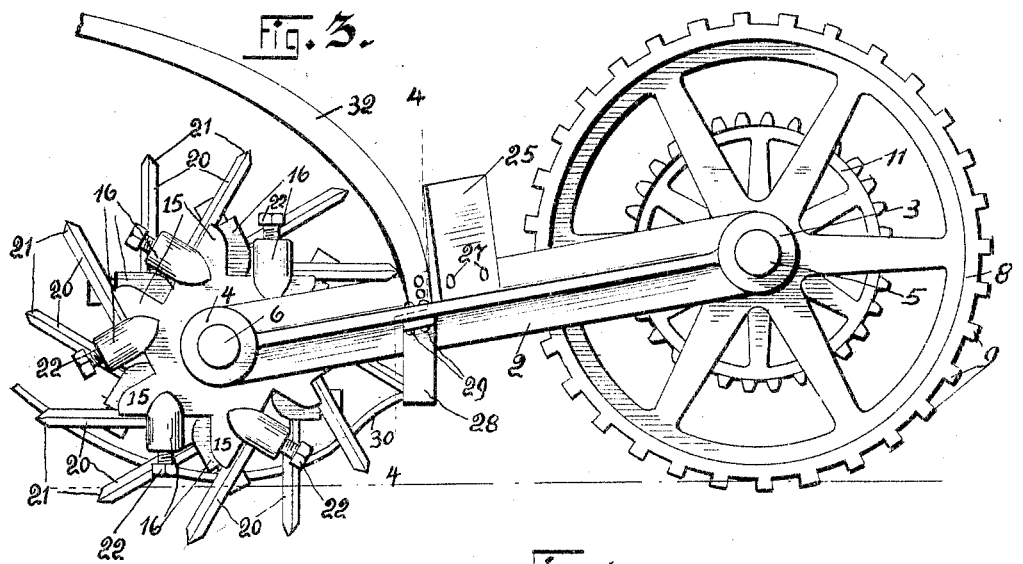
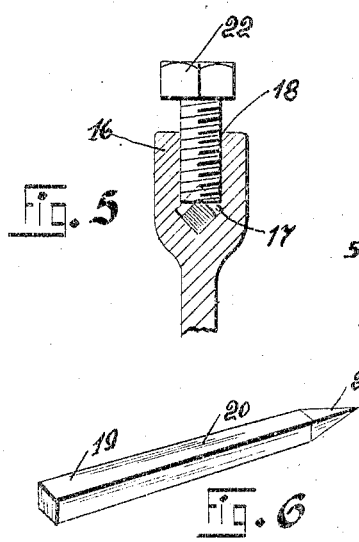
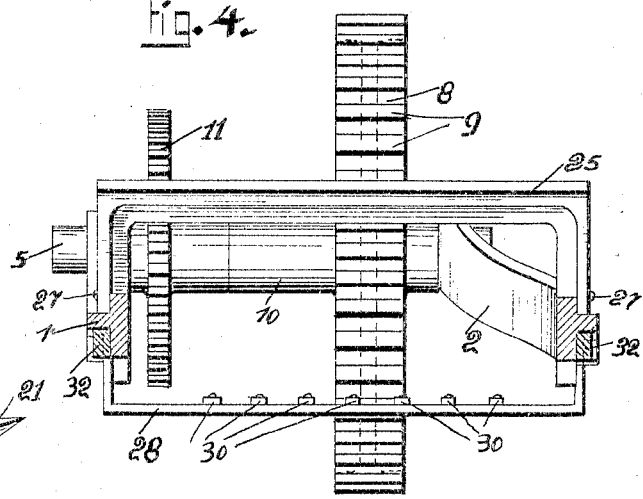

No. 783,796.

Patented February 28, 1905.

UNITED STATES PATENT OFFICE.

WILLIAM NEWBY, OF DEHAVEN, PENNSYLVANIA.

CULTIVATOR.

SPECIFICATION forming part of Letters Patent No. 783,796, dated February 28, 1905.

Application filed July 20, 1904. Serial No. 217,354.

*To all whom it may concern:*

Be it known that I, WILLIAM NEWBY, a subject of the King of Great Britain, residing at Dehaven, in the county of Allegheny and State of Pennsylvania, have invented certain new and useful Improvements in Cultivators, of which the following is a specification, reference being had therein to the accompanying drawings.

This invention has relation to cultivators, and more particularly to that class which are manually operated; and this invention has for its object to provide a cultivator of the above type which will thoroughly agitate and till the soil over which it passes.

Another object of this invention is to construct a cultivator which will be comparatively simple in construction, strong and durable, and highly efficient when used for tilling the soil.

Briefly described, the cultivator is constructed upon as simple lines as possible and of as few pieces as possible to maintain a construction which will withstand the rough use to which implements of this character are generally subjected, and I employ a framework in each end of which is journaled an axle, and upon the front axle is mounted a large corrugated wheel and a gear-wheel. Upon the rear axle is mounted a plurality of heads, in each of which is mounted a series of teeth or agitators, and upon the rear axle is mounted a gear-wheel which is connected to the gear-wheel of the forward axle by a sprocket-chain, and the framework is provided with a suitable handle whereby the cultivator may be propelled over the soil to thoroughly agitate and till the same.

The construction set forth above will be hereinafter more fully described, and specifically pointed out in the claims, and, referring to the drawings accompanying this application, like numerals of reference indicate like parts throughout the several views, in which—

Figure 1 is a longitudinal sectional view of my improved cultivator. Fig. 2 is a horizontal sectional view of the same. Fig. 3 is a side elevation view of the cultivator. Fig. 4 is a transverse sectional view taken on the line 4 4 of Fig. 3. Fig. 5 is a vertical sectional view of a portion of one of the teeth-retaining cups, and Fig. 6 is a detail perspective view of one of the teeth.

To put my invention into practice, I employ two side frames 1 and 2, these frames being preferably constructed of T-shaped irons and are provided upon their ends with enlarged bosses 3 3 and 4 4, and in the bosses 3 3 is journaled an axle 5, and in the bosses 4 4 is journaled an axle 6. The side frame 2 has its forward end bent inwardly, as designated by the reference-numeral 7, making the forward end of the cultivator of a less width than the rear end. Consequently the axle 5 is shorter than the axle 6, and upon the axle 6 I mount a large wheel 8. This wheel has its rim corrugated, as indicated at 9, whereby the same will readily grip the soil over which the same travels. Between the side frame 1 and the hub 10 of the wheel 8 I mount a sprocket-wheel 11, the object of which will be hereinafter more fully described.

The reference-numeral 12 indicates the hub portion of one of the series of heads 14, which are mounted upon the rear axle 6. Each one of these heads 14 has its periphery sheared to form tangentially-disposed lugs 15, and formed integral with said lugs are the tooth-retaining cups 16, one of these cups being shown in vertical section in Fig. 5 of the drawings. Each cup is provided with an orifice 17, with which communicates a screw-threaded aperture 18, and in the orifice 17 is secured the rear end 19 of a cultivating-tooth 20, the outer end of which is tapered, as indicated at 21, whereby the teeth will engage the soil and thoroughly agitate the same. The teeth are secured in the orifice 17 by set-screws 22, which are secured in the screw-threaded apertures 18. The heads are mounted upon the axle 6 in staggered relation to one another, as shown in Figs. 1 to 3, inclusive, and upon the axle 6, between the frame 1 and the blade-head mounted on that end of the axle, is a sprocket-wheel 23, over which is adapted to pass a sprocket-chain 24, which is shown in Figs. 1, 2, and 3 of the drawings, this sprocket-chain passing over the sprocket-wheel 11, carried by the axle 5.

To strengthen and brace the side frames 1 and 2, I employ a U-shaped bracket 25, which preferably constructed of T-shaped iron, and the bracket extends over the cultivator and has its depending ends 26 26 secured, as indicated at 27, to the side frames 1 and 2. The side frames are further braced and supported by a bracket 28, which extends under the cultivator, and has its upwardly-extending ends connected to the side frames, as designated by the reference-numerals 29 29, this bracket serving a double function, which will now be described.

The reference-numerals 30 30 indicate a plurality of curved blades, which are secured to the bracket 28, as designated by the reference-numerals 31 31, these blades being mounted between the heads 14 14 and extending beneath the same and having their outer ends bent upwardly, as clearly illustrated in Figs. 1 and 3 of the drawings. In order to propel the cultivator, I employ suitable handles 32 32, which are secured to the side frames, as indicated at 33, these handles extending rearwardly over the heads a suitable distance, so as to be convenient to the manipulator of the same.

When the cultivator is propelled forward, the forward end will be supported by the corrugated wheel 8, and upon the axle 5 being revolved the sprocket-wheel 11 will be rotated, imparting a similar motion to the gear-wheel 23, which is secured upon the axle 6, at which time each head will be revolved, causing each tooth to engage the soil and agitate the same. These teeth when leaving the soil will have a tendency to upheave the soil and throw the same rearwardly, and to overcome this I employ blades 30 30, which travel over the soil and prevent the same from being thrown rearwardly, these blades serving as a clod-breaker to disintegrate the large portions of earth raised by the teeth 20 of the cultivator. By the construction of the heads 14 it will be seen that in case one of the teeth 20 should be broken or become bent it may be easily removed and a new tooth secured in the head, and by arranging each tooth in a staggered relation one to the other I have provided means whereby the soil over which the cultivator travels will be thoroughly disintegrated.

While I have herein shown handles 32 as being secured to the side frames for propelling the same, I wish it to be understood that an attachment may be applied to the front axle, whereby the cultivator may be drawn by a horse or team of horses. It will also be noted that various other changes may be made in the construction of my improved cultivator, especially the general arrangement of the teeth and heads carrying the same, and other changes as will be permissible by the scope of the appended claims.

What I claim is—

1. An implement of the character described, comprising a framework, two axles rotatably mounted in said framework, a corrugated wheel carried by one of said axles, a plurality of heads mounted upon the other axle, a plurality of teeth detachably secured to said heads, a plurality of blades underlying said heads, means for imparting a rotary movement from the first-named axle to the last-named axle, handles secured to said framework, substantially as described.

2. An implement of the character described, comprising a framework, axles mounted in said framework, a wheel carried by one of said axles, a plurality of heads mounted upon the other axle, a plurality of teeth adjustably mounted on said heads, a plurality of blades carried by said framework, and extending rearwardly between said heads, means for imparting a rotary movement from the first-named axle to the last-named axle, handles carried by said framework, substantially as described.

3. An implement of the character described, comprising a framework, axles mounted in said framework, a plurality of heads mounted upon one of said axles, a plurality of teeth adjustably mounted on said heads, a plurality of blades mounted between said heads, and means for imparting a rotary movement to said heads, substantially as described.

4. An implement of the character described comprising a framework, axles journaled in said framework, a plurality of heads mounted upon said axle, a plurality of teeth adjustably mounted upon said heads, a plurality of blades carried by said framework, and extending rearwardly between said heads, handles carried by said framework, and means for imparting a rotary movement to said heads, substantially as described.

5. An implement of the character described comprising two side frames, axles journaled between said side frames, a wheel carried by one of said axles, a plurality of heads carried by the other axle, a plurality of teeth adjustably mounted upon said heads, a plurality of blades supported from said framework, said blades extending rearwardly between said heads, handles carried by said side frames, and means for imparting a rotary movement to said heads, substantially as described.

6. An implement of the character described comprising a framework, axles journaled in said framework, a wheel rotatably mounted upon one of said axles, a plurality of heads mounted upon the other axle, each of said heads being arranged in a staggered relation to the other, a plurality of tangentially-disposed teeth adjustably secured to each head, a plurality of blades arranged between said heads, handles carried by said framework, and means for imparting a revoluble motion to said heads.

7. A cultivator of the character described comprising a framework, a plurality of heads staggeredly arranged within said framework, a plurality of tangentially-disposed teeth adjustably mounted upon each head, a blade interposed between each head, and means for imparting a revoluble motion to said heads.

8. A cultivator of the character described comprising a framework, axles mounted in said framework, a wheel mounted upon one of said axles, a plurality of heads staggeredly arranged upon the other of said axles, a plurality of tangentially-disposed teeth adjustably attached to each head, a plurality of blades supported by said framework and arranged between each head, handles secured to the framework and means for imparting a revoluble motion to said heads from the first-named axle, substantially as described.

9. In a cultivator of the character described, the combination with an axle, heads mounted on said axle, each head being provided with a plurality of cups formed with tangential openings and blades socketed in said cups.

10. In a cultivator, the combination with a rotary axle and means for imparting motion to the axle, of a plurality of heads mounted on said axle, cups carried by said heads, said cups having tangentially-disposed openings therethrough, blades socketed in the tangential openings in said cups and set-screws screwing into the cups and holding the blades in position therein.

In testimony whereof I affix my signature in the presence of two witnesses.

WILLIAM NEWBY.

Witnesses:
 H. C. Evert,
 E. E. Potter.